US008577679B2

(12) United States Patent  (10) Patent No.: US 8,577,679 B2
Kitade et al. (45) Date of Patent: Nov. 5, 2013

(54) SYMBOL INSERTION APPARATUS AND SYMBOL INSERTION METHOD

(75) Inventors: Tasuku Kitade, Tokyo (JP); Takafumi Koshinaka, Tokyo (JP)

(73) Assignee: NEC Corporation, Tokyo (JP)

( * ) Notice: Subject to any disclaimer, the term of this patent is extended or adjusted under 35 U.S.C. 154(b) by 445 days.

(21) Appl. No.: 12/863,945

(22) PCT Filed: Jan. 19, 2009

(86) PCT No.: PCT/JP2009/050641
§ 371 (c)(1),
(2), (4) Date: Jul. 21, 2010

(87) PCT Pub. No.: WO2009/101837
PCT Pub. Date: Aug. 20, 2009

(65) Prior Publication Data
US 2010/0292989 A1   Nov. 18, 2010

(30) Foreign Application Priority Data

Feb. 13, 2008 (JP) ................................. 2008-031287

(51) Int. Cl.
*G10L 15/26* (2006.01)
(52) U.S. Cl.
USPC ........................................................ 704/235
(58) Field of Classification Search
USPC ........................................................ 704/235
See application file for complete search history.

(56) References Cited

U.S. PATENT DOCUMENTS

| 5,890,117 | A  | * | 3/1999 | Silverman ...................... 704/260 |
| 7,580,838 | B2 | * | 8/2009 | Divay et al. ................... 704/257 |
| 2012/0143607 | A1 | * | 6/2012 | Longe et al. .................. 704/235 |

FOREIGN PATENT DOCUMENTS

| JP | 62-34200 A    | 2/1987  |
| JP | 2000029496 A  | 1/2000  |
| JP | 2001134289 A  | 5/2001  |
| JP | 2003295888 A  | 10/2003 |

OTHER PUBLICATIONS

International Search Report for PCT/JP2009/050641 mailed Mar. 24, 2009.
K. Shitaoka et al., "Interaction between Depencency Structure Analysis and Sentence Boundary Detection in Spontaneous Japanese", Journal of Natural Language Processing, vol. 12, No. 3, Jul. 2005, pp. 3-17.

* cited by examiner

*Primary Examiner* — Jakieda Jackson

(57) ABSTRACT

Enables symbol insertion evaluation in consideration of a difference in speaking style features between speakers. For a word sequence transcribing voice information, the symbol insertion likelihood calculation means 113 obtains a symbol insertion likelihood for each of a plurality of symbol insertion models supplied for different speaking style features. The speaking style feature similarity calculation means 112 obtains a similarity between the speaking style feature of the word sequence and the plurality of speaking style feature models. The symbol insertion evaluation means 114 weights the symbol insertion likelihood obtained for the word sequence by each of the plurality of symbol insertion models according to the similarity between the speaking style feature of the word sequence and the plurality of speaking style feature models and the relevance between the symbol insertion model and the speaking style feature model, and performs symbol insertion evaluation to the word sequence.

26 Claims, 7 Drawing Sheets

SYMBOL INSERTION APPARATUS AND SYMBOL INSERTION METHOD

This application is the National Phase of PCT/JP2009/050641, filed Jan. 19, 2009, which claims priority rights based on the Japanese Patent Application No. 2008-031287 filed in Japan on Feb. 13, 2008, the entire disclosure of which is hereby incorporated by reference herein.

TECHNICAL FIELD

The present invention relates to a symbol insertion apparatus and a symbol insertion method, and particularly to a symbol insertion apparatus and a symbol insertion method for inserting a particular symbol such a punctuation mark in a transcribed and a voice recognized text.

BACKGROUND ART

In the case of transcribing and saving voice uttered by a speaker at a lecture or meeting and the like, in Japanese, it is necessary to clarify a sentence boundary by inserting a period in a suitable position. Further, it is also necessary to clarify boundaries, such as a clause, by inserting punctuation marks in a suitable position of a sentence. However, the symbol itself, such as a period and comma, is not explicitly uttered by the speaker. Therefore, a technique for detecting which position in a transcribed word sequence to insert a symbol is required. The present invention relates to such symbol insertion technique.

An example of the symbol insertion technique relevant to the present invention is disclosed in the section 3.2 of non-patent document 1. In the symbol insertion technique disclosed in the non-patent document 1, the detection of a sentence boundary is performed using the length of a pause taken by a speaker, and word information which appears before and after the pause. To be specific, a string X not including a period but pause information and a string Y including a period are considered to be different languages, and by the statistical machine translation, it is formulized as a problem for obtaining the string Y to have maximum P(Y|X), as illustrated in the following formula.

$$\max_Y P(Y \mid X) = \max_Y P(Y) P(X \mid Y) \quad (1)$$

To be more specific, to all the position in which a pause can be converted into a period (P(X|Y)=1), language model likelihood P(Y) in the case of inserting a period is compared with language model likelihood P(Y) in the case of not inserting a period, in order to perform evaluation of inserting a period. Here, a model depending on an expression before and after the pause and the pause length is used for a conversion model P(X|Y). Further, a word 3-gram model learned from transcriptions of CSJ (Corpus of Spontaneous Japanese) which is manually added with sentence boundaries is used to calculate language model likelihood P(Y).
[Non-Patent Document 1]
Shimooka et al., "Interaction between Dependency Structure Analysis and Sentence Boundary Detection in Spontaneous Japanese", Journal of natural language processing, 2005, 12(3)

DISCLOSURE OF INVENTION

Technical Problem

According to the symbol insertion technique relating to the present invention, in a transcribed word sequence of voice uttered by a certain speaker, for example in a word sequence of " . . . if the heat-retaining effect is obtained the effective temperature rises by approximately 2 Celsius degrees", if the pause length immediately after "is obtained" is long enough, that position is evaluated as a sentence boundary, and a period is inserted as in " . . . if the heat-retaining effect is obtained. The effective temperature rises by approximately 2 Celsius degrees". On the contrary, if the pause length immediately after "is obtained" is short enough, the position is not evaluated as the sentence boundary, and the whole " . . . if the heat-retaining effect is obtained the effective temperature rises by approximately 2 Celsius degrees" is treated as one sentence. The position where an extremely long pause length appears as the one described above, it is possible to detect a symbol insertion point with certain degree of accuracy regardless of a difference between speakers.

However, the speaking styles generally differ from each speaker, and the way to take a pause at a punctuation insertion point, and phrase end and sentence end expressions differ depending on the speaker. For example, among multiple speakers that have the same pause length immediately after "is obtained", in the case of a person with fast speech speed, the pause length immediately after "is obtained" is relatively longer than the pause length in the other points, thus there is a high possibility of inserting a period in the point, whereas in the case of a person with slow speech speed, it is the opposite thereof. Further, some speakers rarely uses the expression like "if . . . sentence end" as in "if . . . obtained", and others do not.

In the above symbol insertion technique relevant to the present invention, a symbol insertion likelihood is calculated using one kind of model (word 3-gram model) learned from the transcriptions of CSJ (Corpus of Spontaneous Japanese), thus it is not possible to perform symbol insertion evaluation in consideration of the difference in the speaking style features between each speaker.

The purpose of the present invention is to enable symbol insertion evaluation in consideration of the difference in the speaking style features between each speaker by performing symbol insertion evaluation using a symbol insertion model according to the speaker's linguistic and acoustic features such as expressions and the way to take a pause.

Technical Solution

A symbol insertion apparatus according to the present invention is a symbol insertion apparatus for inserting a symbol in a word sequence transcribing voice information that weights symbol insertion likelihood obtained for each of a plurality of symbol insertion models for the word sequence to insert the symbol in, which are supplied for each speaking style feature according to a similarity between the speaking style feature of the word sequence and a plurality of the speaking style feature models and relevance between the symbol insertion model and the speaking style feature model, and performs symbol insertion evaluation to the word sequence.

Advantageous Effects

According to the present invention, it is possible to perform symbol insertion evaluation in consideration of the difference in the speaking style features of each speaker. The reason is that insertion evaluation of a symbol is performed, emphasizing on a symbol insertion model that matches the speaking style features of the speaker for an input word sequence among multiple symbol insertion models that suit the linguistic and acoustic speaking style features of the speaker such as expressions and the way to take a pause.

BRIEF DESCRIPTION OF DRAWINGS

FIG. 2 illustrates a configuration example of word sequence information to insert a symbol in;

EXPLANATION OF REFERENCE 100, 200 SYMBOL INSERTION APPARATUS
101 PROCESSING APPARATUS
102 INPUT APPARATUS
103-1 to 103-$n$ SYMBOL INSERTION MODEL STORAGE APPARATUS
104-1 to 104-$n$ SPEAKING STYLE FEATURE MODEL STORAGE APPARATUS
105 OUTPUT APPARATUS
111 WORD SEQUENCE INFORMATION STORAGE MEANS
112 SPEAKING STYLE FEATURE SIMILARITY CALCULATION MEANS
113 SYMBOL INSERTION LIKELIHOOD CALCULATION MEANS
114, 202 SYMBOL INSERTION EVALUATION MEANS
115 SYMBOL INSERTED WORD SEQUENCE INFORMATION STORAGE MEANS
201 MODEL RELEVANCE STORAGE APPARATUS
300 VOICE RECOGNITION APPARATUS
301 MICROPHONE
311 VOICE RECOGNITION MEANS
312 WORD SEQUENCE INFORMATION GENERATION MEANS

BEST MODE FOR CARRYING OUT THE INVENTION

Next, the best mode for carrying out the present invention is explained in detail with reference to the drawings. Hereinafter, an example of inserting a punctuation mark in a word sequence in Japanese spoken language is used, however the present invention can be applied to any, language or any symbol, for example in English spoken language, by inserting a comma or period in a word sequence. Note that a space and line feed or the like shall be included in the concept of the symbol in the present invention.

Embodiment 1

Figure 1:
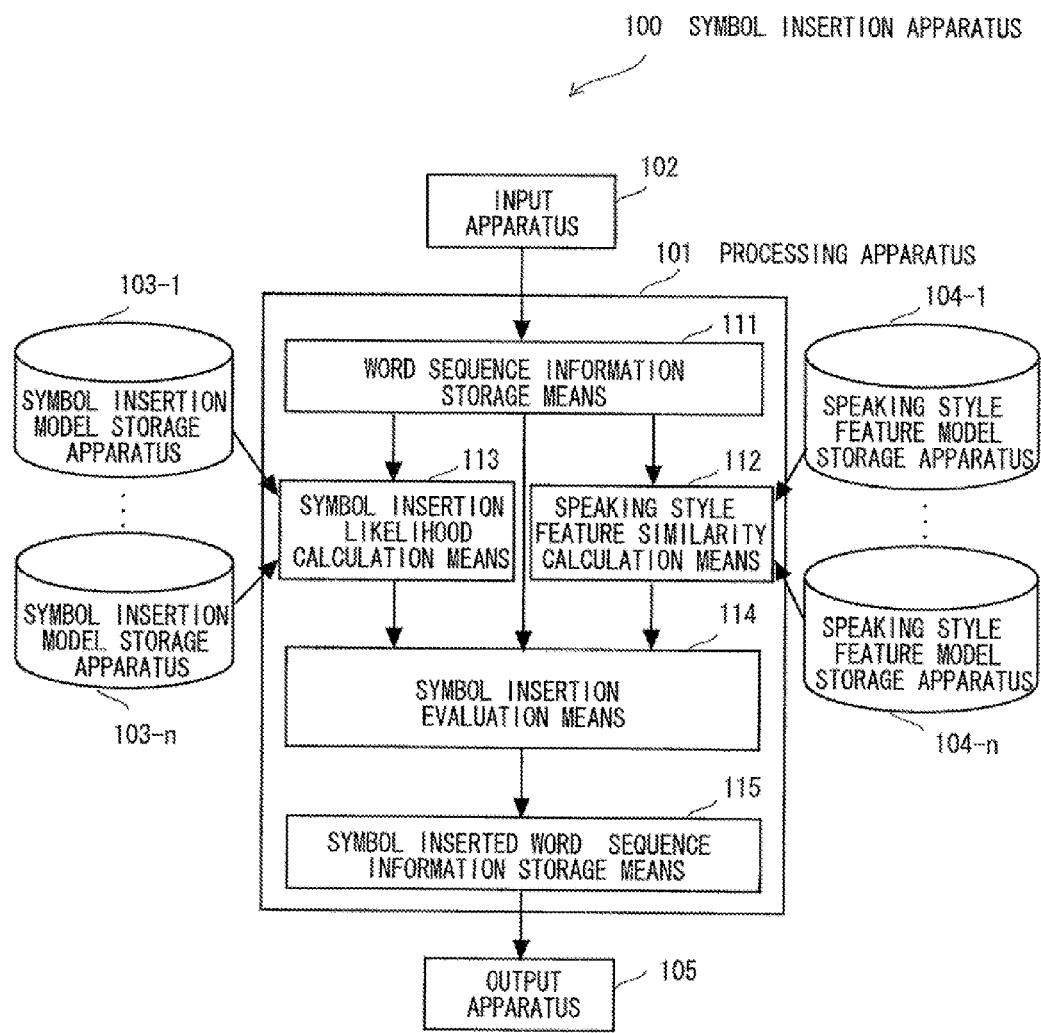
FIG. 1 is a block diagram of an embodiment 1 of the present invention.

Referring to FIG. 1, a symbol insertion apparatus 100 according to the embodiment 1 of the present invention is composed of a processing apparatus 101, an input apparatus 102 connected to this processing apparatus 101, n number of symbol insertion model storage apparatuses 103-1 to 103-$n$, and similarly, n number of speaking style feature model storage apparatuses 104-1 to 104-$n$, and an output apparatus 105.

Moreover, the processing apparatus 101 includes a word sequence information storage means 111, a speaking style similarity calculation means 112, a symbol insertion likelihood calculation means 113, a symbol insertion evaluation means 114, and a symbol inserted word sequence information storage means 115.

The speaking style similarity calculation means 112, the symbol insertion likelihood calculation means 113, and the symbol insertion evaluation means 114 can be realized by a computer that composes the processing apparatus 101 and a program executed thereon. The program is recorded on a computer-readable recording media, such as a magnetic disk, read by a computer at computer startup for example. By controlling the operation of the computer, the speaking style similarity calculation means 112, the symbol insertion likelihood calculation means 113, and the symbol insertion evaluation means 114 are realized on the computer. Further, each of the storage apparatuses 103-1 to 103-$n$, and 104-1 to 104-$n$, the word sequence information storage means 111 and the symbol inserted word sequence information storage means 115 in the processing apparatus 101 can be realized by a main memory and an auxiliary storage apparatus which are included in the computer.

The input apparatus 102 is an apparatus to input information of word sequences in the spoken language to insert a symbol in into the processing apparatus 101, and is composed of a keyboard, filing apparatus, and data reception apparatus or the like. The information of word sequences in the spoken language is a transcribed text or voice recognized text that is added with grammar information (for example word class information) and acoustic information (for example pause information) required by the speaking style feature similarity calculation means 112 and the symbol insertion likelihood calculation means 113.

Figure 2:
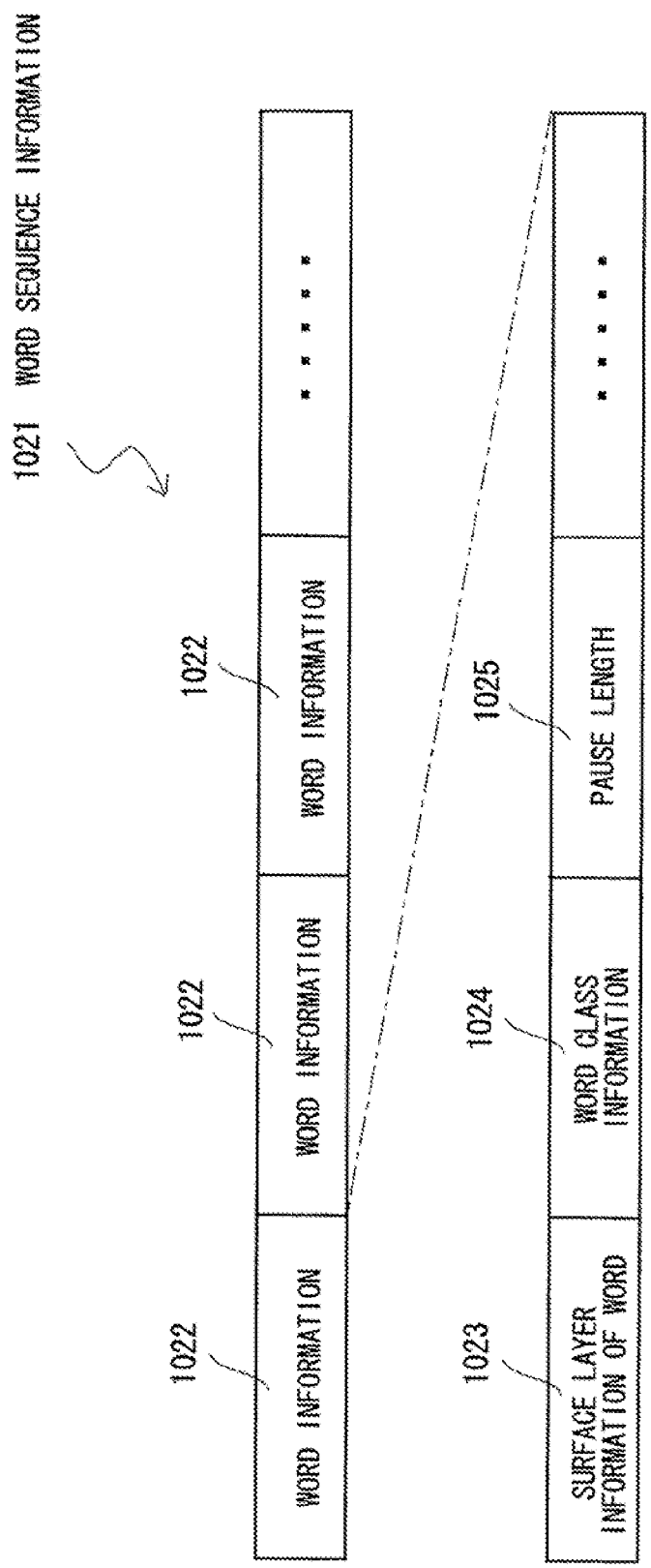

The word sequence information storage means 111 stores the information of word sequences input from the input apparatus 102. Referring to FIG. 2, for word sequence information 1021 stored to the word sequence information storage means 111, word information 1022 for each word is arranged in order of utterance of words. Moreover, each of the word information 1022 includes surface layer information 1023 of the word, word class information 1024 indicating a word class and inflected forms of the word, a pause length 1025 between the word and the next word, and other information. As for other information, there is speech speed, for example.

The symbol insertion model storage apparatuses 103-1 to 103-$n$ store symbol insertion models learned using learning data of the speakers each with different speaking style features. The symbol insertion model is a modeled probability of inserting a period and comma using the linguistic information (the surface layer information and the word class information or the like of a word) and the acoustic information (including pause information). The symbol insertion model can be created using known techniques such as identification models (non-patent document 1) including a word with symbol n-gram model, support vector machine (SVM), conditional random field (CRF), and rule-based model. The individual symbol insertion model itself is the same as a model of the symbol insertion used in the non-patent document 1, for example, and a difference from conventional ones is that the symbol insertion model is supplied for each different speaking style features.

The symbol insertion likelihood calculation means 113 is a means to read the word sequence information 1021 from the word sequence information storage means 111 by a unit of the word information 1022, and for each word information 1022, calculates a symbol insertion likelihood indicating an accuracy level of inserting a period and comma immediately after a word having the word information, and a symbol insertion likelihood indicating an accuracy level of not inserting a punctuation mark, for each of the symbol insertion models stored to the symbol insertion model storage apparatus 103-1 to 103-$n$.

The speaking style feature model storage apparatuses 104-1 to 104-$n$ store the speaking style feature models learned using the learning data of the speakers with different speaking style features. The speaking style feature model is a speaking style feature modeled using voice information of the speaker. As for the voice information, there is language information (frequency information of a sentence end expression, etc.), acoustic information (pause information, speech speed information, and utterance continuation time length, or the like). In the case of this embodiment, the speaking style model storage apparatuses 104-1 to 104-$n$ correspond one-to-one to the symbol insertion model storage apparatuses 103-1 to 103-$n$. That is, the speaking style feature model stored to the speaking style model storage apparatus 104-$i$ is a modeled speaking style feature of speaking style features of a speaker of the learning data used to learn the symbol insertion model that is stored to the corresponding symbol insertion model storage apparatus 103-$i$.

As a simple example of the speaking style feature model using the acoustic information, there are speech speed value and pause length for each word, and an average speech speed value and average pause length by a unit of a segment or utterance, for example. As a simple example of the speaking style feature model using the language information is the frequency information of a sentence end expression. Other example of the speaking style feature model is described in detail in the subsequent mode for the invention.

The speaking style similarity calculation means 112 is a means to read the word sequence information 1021 from the word sequence information storage means 111 by the unit of the word information 1022, extract the speaking style features, and calculates the similarity between the extracted speaking style features and the speaking style features that is modeled by the speaking style feature model stored to the speaking style feature model storage apparatus 104-1 to 104-$n$. The unit of extracting the speaking style features from the word sequence information 1021 may be by the predetermined number of words, entire utterance of one speaker, or entire word sequence information 1021 stored to the word sequence information storage means 111.

The symbol insertion evaluation means 114 is a means to weight the symbol insertion likelihood obtained by the symbol insertion likelihood calculation means 113 for different symbol insertion models of the word sequences stored to the word sequence information storage means 111 by the similarity between the speaking style features of the word sequence obtained by the speaking style feature similarity calculation means 112 and multiple speaking style feature models and the relevance between the symbol insertion model and the speaking style feature model, perform symbol insertion evaluation to the word sequence, and store the information of the word sequence inserted with symbols according to the evaluation result to the symbol inserted word sequence information storage means 115.

In the case of this embodiment, the speaking style feature model storage apparatuses 104-1 to 104-$n$ correspond one-to-one to the symbol insertion model storage apparatuses 103-1 to 103-$n$, thus the symbol insertion evaluation means 114 weights by multiplying the symbol insertion likelihood for each symbol insertion model obtained using the symbol insertion likelihood calculation means 113 by the similarity with the corresponding speaking style feature model.

Further, the symbol insertion evaluation means 114 determines whether it is possible to insert a punctuation mark and a kind of the symbol to insert for example by one of the following methods using the weighted symbol insertion likelihood for different symbol insertion models.

(1) Sign Insertion Evaluation Method 1

The total of high-order n' (n' is a constant of one or more and n or less, the same shall apply hereinafter) number of weighted period insertion likelihood of each symbol insertion model is calculated as integrated insertion likelihood of a period, the total of high-order n' number of weighted comma insertion likelihood of each symbol insertion model is calculated as integrated insertion likelihood of a comma, and weighted NULL insertion likelihood (likelihood of not inserting a period nor comma) of each symbol insertion model is calculated as integrated insertion likelihood of NULL. Next, the largest total insertion likelihood shall be the symbol insertion evaluation result. For example, among three integrated insertion likelihood, if the integrated insertion likelihood of a period is the largest, an evaluation result of inserting a period is generated.

(2) Sign Insertion Evaluation Method 2

The total of high-order n' number of the weighted period insertion likelihood of each symbol insertion model is calculated as the integrated insertion likelihood of a period, and the total of high-order n' number of the weighted comma insertion likelihood of each symbol insertion model is calculated as the integrated insertion likelihood of comma. Next, if the predetermined priorities between multiple symbols in the order of higher priority are a period and then comma, firstly, the integrated insertion likelihood of a period is compared with a predetermined threshold. If it is more than or equal to the threshold, an evaluation result indicating of period insertion is generated. If the integrated insertion likelihood of a period is not the predetermined threshold or more, next, the integrated insertion likelihood of a comma is compared with the predetermined threshold. If it is more than or equal to the threshold, an evaluation result indicating of comma insertion is generated. If the integrated insertion likelihood of a comma is not more than or equal to the threshold, an evaluation result of not inserting a punctuation mark is generated.

(3) Sign Insertion Evaluation Method 3

For each symbol insertion model, the symbol (period, comma, and NULL) of the largest insertion likelihood among the weighted period insertion likelihood, the weighted comma insertion likelihood, and the weighted NULL insertion likelihood is obtained, and the symbol (period, comma, and NULL) which was requested the most is obtained by majority decision to be an evaluation result.

The output apparatus 105 is a display, printer, filing apparatus, data transmission apparatus that reads and outputs the information of word sequence inserted with symbols from the symbol inserted word sequence information storage means 115.

Figure 3:
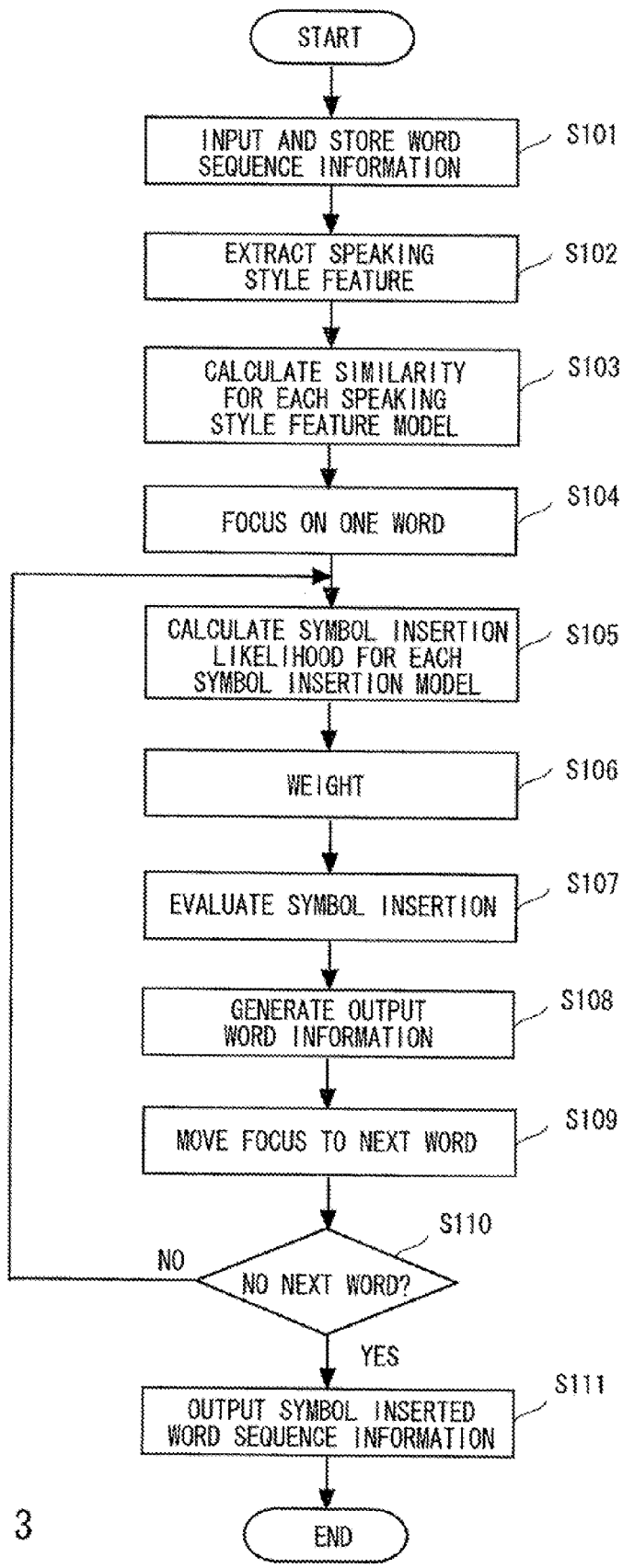
FIG. 3 is a flowchart illustrating a process flow in the embodiment 1 of the present invention.

Next, the whole operation of this embodiment is described in detail with reference to the flowchart of FIG. 3.

If information of the word sequence to insert a symbol in is input from the input apparatus 102, the processing apparatus 101 stores it to the word sequence information storage means 111 as illustrated in FIG. 2 (S101).

Next, the processing apparatus 101 reads the information 1021 of a word sequence that is stored to the word sequence information storage means 111 by the speaking style similarity calculation means 112, and extracts linguistic or acoustic speaking style features such as features of expressions and a way to take a pause (S102). The unit of extracting the speaking style features may be the entire word sequence information 1021 stored to the word sequence information storage means 111 or by the predetermined number of words. Next, the processing apparatus 101 reads the speaking style feature model from the speaking style feature model storage apparatuses 104-1 to 104-$n$ by the speaking style feature similarity calculation means 112, and calculates the similarity with the speaking style features of the input word sequence extracted in the step S102 for each speaking style feature model and also each extraction unit (S103). The similarity for each speaking style feature model and also each extraction unit calculated here is stored to a memory not illustrated in the speaking style feature similarity calculation means 112 until the symbol insertion evaluation is done.

Next, the processing apparatus 101 focuses on a word included in the first word information 1022 in the word sequence information 1021 of the word sequence that is stored to the word sequence information storage means 111 (S104). Next, the symbol insertion model is read from symbol insertion model storage apparatuses 103-1 to 103-$n$, and calculate a period insertion likelihood of inserting a period immediately after the focused word, a comma insertion likelihood of inserting a comma, and a NULL insertion likelihood of inserting nothing, for each of the symbol insertion model (S105).

Next, the processing apparatus 101 performs weighting by multiplying the symbol insertion likelihood obtained for each symbol insertion model using the symbol insertion likelihood calculation means 113 by the similarity between the corresponding speaking style feature model and the speaking style feature of the input word sequence (S106). The similarity used here is by the extraction unit where the focused word belongs to among the similarities calculated and stored for each extraction unit.

Next, the processing apparatus 101 determines by the symbol insertion likelihood calculation means 113 whether it is possible to insert a punctuation mark immediately after the focused word, and in the case of insertion, which of the symbols, a period and comma, according one of the above-mentioned (1) to (3) of the symbol insertion evaluation methods (S107). Then, the symbol insertion likelihood calculation means 113 generates output word information including the focused word according to the symbol insertion evaluation result, and stores it to the symbol inserted word sequence information storage means 115 (S108). Specifically, if evaluated that a period should be inserted, the output word information of the focused word added with period information thereafter is generated. If evaluated that a comma should be inserted, the output word information of the focused word added with comma information thereafter is generated. If evaluated that NULL should be inserted, the output word information including only the focused word is generated. The information is respectively stored to the symbol inserted word sequence information storage means 115.

After finishing the process of focusing the first word in the information 1021 of the word sequence stored to the word sequence information storage means 111, the processing apparatus 101 moves focus to the second word in the information 1021 of the word sequence (S109), and repeats the processes of the steps S105 to S108. Once the processing apparatus 101 completes the process to focus the last word in the information 1021 of the word sequence stored to the word sequence information storage means 111 (YES in the step S110), the information of the word sequence with symbols inserted stored to the symbol inserted word sequence information storage means 115 is output from the output apparatus 105 (S111).

Next, an effect of this embodiment is explained.

According to this embodiment, it is possible to perform symbol insertion evaluation in consideration of the difference in the speaking style features between speakers. The reason is that insertion evaluation of a punctuation mark is performed, emphasizing on a symbol insertion model that matches the speaking style features of the speaker for an input word sequence among multiple symbol insertion models that suit the linguistic and acoustic speaking style features of the speaker such as expressions and the way to take a pause.

Mode for the Invention of Embodiment 1

Next, one mode for the invention of this embodiment is described focusing on the speaking style feature model, symbol insertion model, speaking style feature similarity calculation, symbol insertion likelihood calculation, and symbol insertion evaluation.

(1) An Example of Creating a Speaking Style Feature Model

Figure 4:
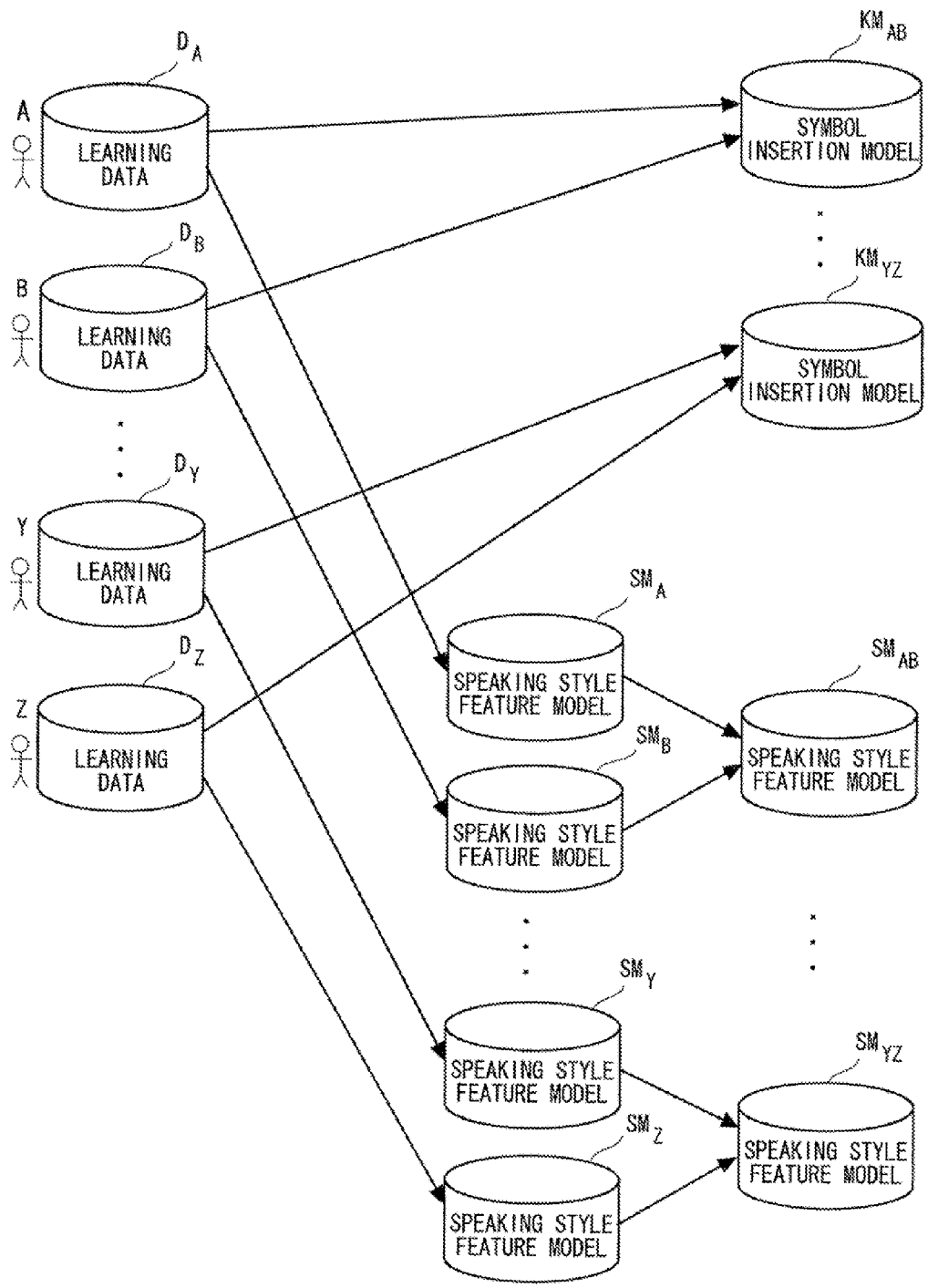
FIG. 4 is an explanatory diagram of a method of creating a speaking style feature model and a symbol insertion model using the same learning data.

As illustrated in FIG. 4, firstly, prepare learning data $D_A$ to $D_Z$ for each of speakers A to Z. As the learning data $D_A$ of the speaker A, for example voice data of recorded daily conversation or conversation at a lecture, or text data which is made by manually transcribing voice data, inserting periods and commas, and adding acoustic feature amount such as the pause length. The same applies to the learning data $D_B$ to $D_Z$ of the speakers B to Z other than the speaker A.

Next, create speaking style feature models $SM_A$ to $SM_Z$ for each of the speakers A to Z using the learning data $D_A$ to D. In this mode for the invention, a voice feature model for each speaker is created using linguistic and acoustic feature amount for each speaker. As the acoustic feature amount to use, there can be the pause length and speech speed, for example.

As for the learning data $D_Y$ of the speaker Y, the point where a symbol $C_k$ (period and comma) should be inserted is detected, and word $w_{Y,t}$ immediately before the point to insert the symbol $C_k$, and a pause length $dur(w_{Y,t},C_k)$ are extracted. After extracting the above information for all the learning data $D_Y$ of the speaker Y, as a distribution function of the speaking style feature model, a distribution function $f_{dur}(x, Y,C_k)$ of the voice feature model is obtained in which the symbol $C_k$ is inserted after the word $w_{Y,t}$ having the pause length $dur(w_{Y,t},C_k)$ immediately thereafter. Here, x is a voice feature amount and, in this case, it is the pause length. Among the words uttered by the speaker Y, suppose that the pause length at the time of uttering the word $w_{Y,t}$ is $dur(w_{Y,t},C_k)$, and the frequency of inserting the symbol $C_k$ is $N(w_{Y,t},dur(w_{Y,t},C_k))$, then the distribution function $f_{dur}(x,Y,C_k)$ is defined by the following formula $$f_{dur}(x, Y, C_k) = \frac{\sum_{w_{Y,t}, 0<dur(w_{Y,t},C_k)\leq x} N(w_{Y,t}, dur(w_{Y,t}, C_k))}{\sum_{w_{Y,t}, dur(w_{Y,t},C_k)>0} N(w_{Y,t}, dur(w_{Y,t}, C_k))} \quad (2)$$

In the formula (2), a denominator of the right-hand side indicates the total number of the symbol $C_k$ inserted immediately after the word $w_{Y,t}$ in the learning data $D_Y$ regardless of the pause length. The numerator indicates the total number of the symbol $C_k$ inserted when the pause length $dur(w_{Y,t}, C_k)$ is x or less. That is, it indicates the ratio that the pause length is x or less and the symbol $C_k$ inserted, and is an accumulation function of likelihood (probability) in which the symbol $C_k$ having the variable pause length is inserted.

If the symbols to insert are periods commas, and $C_1$ is a period and $C_2$ is a comma, it can be said that the distribution function $f_{dur}(x, Y, C_1)$ indicates the feature of the way to use periods immediately after the word $w_{Y,t}$ among the speaking style features of the speaker Y, and the distribution function $f_{dur}(x, Y, C_2)$ represents the feature of the way to use commas immediately after the word $w_{Y,t}$ among the speaking style features of the speaker Y.

However, the distribution function $f_{dur}(x, X, Y, NULL)$ when no symbol is inserted, namely if $C_k$=NULL, is supplied by the following formula.

$$f_{dur}(x, Y, NULL) = \frac{\sum_{w_{Y,t}, dur(w_{Y,t}, NULL) \leq x} N\left(w_{Y,t}, dur\begin{pmatrix} w_{Y,t}, \\ NULL \end{pmatrix}\right)}{\sum_{w_{Y,t}, dur(w_{Y,t}, NULL) > 0} N\left(w_{Y,t}, dur\begin{pmatrix} w_{Y,t}, \\ NULL \end{pmatrix}\right)} \quad (3)$$

In the formula (3), a denominator of the right-hand side is the same as the formula (2), and a numerator represents the total number of the symbol $C_k$ inserted when the pause length $dur(w_{Y,t}, NULL)$ is larger than a threshold x. In other words, it indicates the ratio when the symbol "NULL" is inserted if the pause length is larger than x.

The pause length is used as the acoustic feature amount in the above example, however other acoustic feature amount such as the speech speed may be used, or multiple kinds of acoustic feature amount such as the pause length and the speech speed, may be used as well. In the case of using multiple kinds of acoustic feature amount, a distribution function for each of the acoustic feature amount is generated and weighted.

The speaking style feature model $SM_Y$ of FIG. 4 is equivalent to the distribution function of the speaking style feature model thus created. Further, the speaking style feature models $SM_A, SM_B, \ldots, SM_X$, and $SM_Z$ in FIG. 4 are equivalent to the distribution functions of the speaking style feature models for the speakers A to X, and Z except the speaker Y created in a similar manner as the speaker Y.

Next, as for the speaking style feature models $SM_A$ to $SM_Z$ for each speaker A to Z, two models with similar distribution functions are integrated into one model by the button-up method. In the example of FIG. 4, the speaking style feature models $SM_A$ and $SM_B$ are integrated into one speaking style feature model $SM_{AB}, \ldots$, the speaking style feature models $SM_Y$ and $SM_Z$ are integrated into one speaking style feature model $SM_{YZ}$. A known clustering method is used as the method of integration. The speaking style feature models that were integrated into total number of n are eventually stored to the n number of the speaking style feature model storage apparatuses 104-1 to 104-n in FIG. 1.

(2) An Example of Calculating Speaking Style Feature Similarity

The speaking style feature similarity calculation means 112 calculates likelihood of closeness of the speaking style features (speaking style feature similarity) by the unit of word from the surface layer information and the voice feature amount (pause information or the like) of the word stored to the word string information storage means 111 and the above-mentioned distribution function that composes the speaking style feature model stored to the speaking style feature model storage means 104-1 to 104-n. Specifically, if a value of the jth voice feature amount of a certain word $w_t$ is $x_{t,j}$, a distribution function of the jth voice feature amount of the speaking style feature model stored to the ith speaking style feature model storage means 104-i is $f_j(x_{t,j}, i, C_k)$, and the weight thereof is $a_{i,j}$, the speaking style feature model similarity $T_{i,k}(w_t)$ with the speaking style feature model stored to the ith speaking style feature model storage means 104-i is calculated by the following formula.

$$T_{i,k}(W_t) = \sum_{j}^{n} a_{i,j} \times f_j(x_{t,j}, i, C_k) \quad (4)$$

In the case of inserting a punctuation mark, there are three ways for $C_k$, which are $C_1$, $C_2$, and NULL. Therefore, $T_{i,1}(w_t)$ indicates the similarity regarding the features of the way to use a period immediately after the word $w_t$, $T_{i,2}(w_t)$ indicates the similarity regarding the features of the way to use a comma immediately after the word $w_t$, and $T_{i,NULL}(w_t)$ indicates the similarity regarding the features of not using a punctuation mark immediately after the word $w_1$. Moreover, in the case of using two of the voice feature amount, which is the pause length and the speech speed, the value that can be taken by j is one or two. Constant may be used for the weights $a_{i,j}$ or they may be empirically adjusted while performing a preliminary experiment. Further, supervised data may be supplied in advance by a known technique such as the steepest descent method. The unit to extract the feature amount may be by the unit of a predetermined number stored to the word sequence information storage means 111, or all the stored words may be integrated as one unit, as described above.

(3) An Example of Creating a Symbol Insertion Model

A symbol insertion model is created using the data corresponds to the speaking style feature model, that is, all the learning data used to create the speaking style feature models, which are categorized into speakers and clustered to the models with similar features by the bottom-up method. For example, if the speaking style feature model $SM_{AB}$ to $SM_{YZ}$ are the final n number of speaking style feature models in FIG. 4, the sign insertion model $KM_{AB}$ which corresponds one-to-one to the speaking style feature model $SM_{AB}$ is generated from the learning data $D_A$ of the speaker A and the learning data $D_B$ of the speaker B. The symbol insertion model can be created using a known technique, such as the word with symbol n-gram model, as mentioned above. The created symbol insertion model $KM_{AB}$ to $KM_{YZ}$ are stored to the n number of symbol insertion model storage apparatuses 103-1 to 103-n of FIG. 1.

(4) A Calculation Example of Symbol Insertion Likelihood

For each symbol insertion model, the symbol insertion likelihood calculation means 113 obtains symbol insertion likelihood indicating an accuracy level of the symbol $C_k$ to be inserted (or no symbol is inserted ($C_k$=NULL)) immediately after a certain word $w_t$ using the information including the surface layer information and the word class information of each word which is stored to the word sequence information storage means 111 and the sign insertion model stored to the sign insertion model storage means 103-1 to 103-$n$. Sign insertion likelihood $S_{i,k}(w_t)$ of the symbol $C_k$ to be inserted immediately after the word $w_t$ having the word information $w_t$ can be represented by the following formula using likelihood function $g_i(W,C)$ of the symbol C to be inserted immediately after the word w having the word information W for the ith symbol insertion model, which is learned by the abovementioned known technique.

$$S_{i,k}(w_t) = \frac{g_i(W_t, C_k)}{\sum_{C_k} g_i(W_t, C_k)} \quad (5)$$

In the formula (5), a numerator $g_i(W_t, C_k)$ of the right-hand side is likelihood of the symbol $C_k$ to be inserted immediately after the word $w_t$ when inputting the word information of n number of words (n>1). $S_{i,k}(w_t)$ is the normalized likelihood for the symbol that can be inserted immediately after the word $w_t$.

(5) Sign Insertion Evaluation (5-1) Example 1

The symbol insertion evaluation means 114 firstly calculates a symbol insertion score for different models using the symbol insertion likelihood calculated by the symbol insertion likelihood calculation means 113 and the speaking style similarity calculated by the speaking style feature similarity calculation means 112. To be specific, the symbol insertion score for different models $F_i(w_t, C_k)$ of the ith symbol insertion model is calculated by the following formula using voice feature similarity $T_{i,k}(w_t)$ for the speaking style feature model of the speaking style feature model storage apparatus 104-$i$ for the word $w_t$ and symbol insertion likelihood is $S_{i,k}(w_t)$ for the symbol insertion model stored to the symbol insertion model storage apparatus 103-$i$.

$$F_i(w_t, C_k) = T_{i,k}(w_t) \times S_{i,k}(w_t) \quad (6)$$

In other words, the symbol insertion score for different models $F_i(w_t, C_1)$ in which a period is inserted immediately after the word $w_t$ in the ith symbol insertion model is calculated by multiplying likelihood $S_{i,1}(w_t)$ of inserting a period immediately after the word $w_t$ calculated from the ith symbol insertion model by the similarity $T_{i,1}(w_t)$ regarding the feature of the way to use a period immediately after the word $w_t$ calculated from the ith speaking style feature model as a weight. Further, a symbol insertion score for different models $F_i(w_t, C_2)$ in which a comma is inserted immediately after the word $w_t$ in the ith symbol insertion model is calculated by multiplying likelihood $S_{i,2}(w_t)$ of inserting a comma immediately after the word $w_t$ from the ith symbol insertion model by the similarity $T_{i,2}(w_t)$ regarding the features of the way to use a comma immediately after the word $w_t$ calculated from the ith speaking style feature model as a weight. Furthermore, the symbol insertion score for different models $F_i(w_t, C_{NULL})$ in which a punctuation mark is not inserted immediately after the word $w_t$ in the ith symbol insertion model is calculated by multiplying likelihood $S_{i,NULL}(w_t)$ in which no punctuation mark is inserted immediately after the word $w_t$ calculated from the ith symbol insertion model by the similarity $T_{i,NULL}(w_t)$ regarding the features of not placing a punctuation mark immediately after the word $w_t$ calculated from the ith speaking style feature model as a weight.

Next, the symbol insertion evaluation means 114 calculates an integrated symbol insertion score $F(w_t, C_k)$ used for symbol insertion evaluation using the sign insertion score for different models $F_i(w_t, C_k)$ by the following formula.

$$F_i(w_t, C_k) = \sum_i^{n'} F_i(w_t, C_k) \quad (7)$$

The number n' of the symbol insertion likelihood for obtaining the symbol insertion score $F(w_t, C_k)$ may match the number of the symbol insertion models (or voice feature models) (n'=n), or one or more may be selected from higher likelihood (n'!=n).

Next, the symbol insertion evaluation means 114 outputs a symbol $\hat{C}$ which has the largest symbol insertion score $F(w_t, C_k)$ as indicated in the following formula. However, no symbol is inserted if $\hat{C}$=(NULL) ("no symbol insertion").

$$\hat{C} = \underset{C_k}{\mathrm{argmax}} F(w_t, C_k) \quad (8)$$

(5-2) Example 2

The symbol insertion evaluation means 114 calculates the integrated symbol insertion score $F(w_t, C_k)$ used for symbol insertion evaluation in a similar way as the example 1.

Next, the symbol insertion evaluation means 114, as illustrated in the following formula, inserts a symbol immediately after the word $w_t$ if the integrated symbol insertion score $F(w_t, C_k)$ is larger than the threshold $\theta_k$. Here, the threshold $\theta_k$ may be different depending on the kind of the symbol $C_k$, and can be adjusted. If there are multiple candidates of the symbols to insert such as a period and comma, priorities of the symbol insertion is determined in advance, and the threshold is evaluated in order of the priorities.

$$F(w_t, C_k) > \theta_k \quad (9)$$

(5-3) Example 3

The symbol insertion evaluation means 114 calculates the symbol insertion score for different models $F_i(w_t, C_k)$ in a similar way as the example 1. Next, a symbol insertion evaluation is performed for each symbol insertion model and the symbol with the most evaluation is used as the final output. To be specific, firstly as indicated in the following formula, a symbol $\hat{C}^i$ in which the symbol insertion score $F_i(w_t, C_k)$ has reached its maximum is obtained for all symbol insertion models.

$$\hat{C}^i = \underset{C_k}{\mathrm{argmax}} F_i(w_t, C_k) \quad (10)$$

Next, as illustrated in the following formula, the number of models in which $\hat{C}^i = C_k$ is compared, and the symbol $\hat{C}$ in which the number reaches its maximum is output.

$$\hat{C} = \underset{C_k}{\mathrm{argmax}} \sum_{i=1}^{n} \delta_{C_k \hat{C}^i} \quad (11)$$

However, $\delta_{ij}$ takes one if i=j, or zero in other cases.

Next, the entire operation of this mode for the invention is described in detail with reference to the flowchart of FIG. 5.

Figure 5:
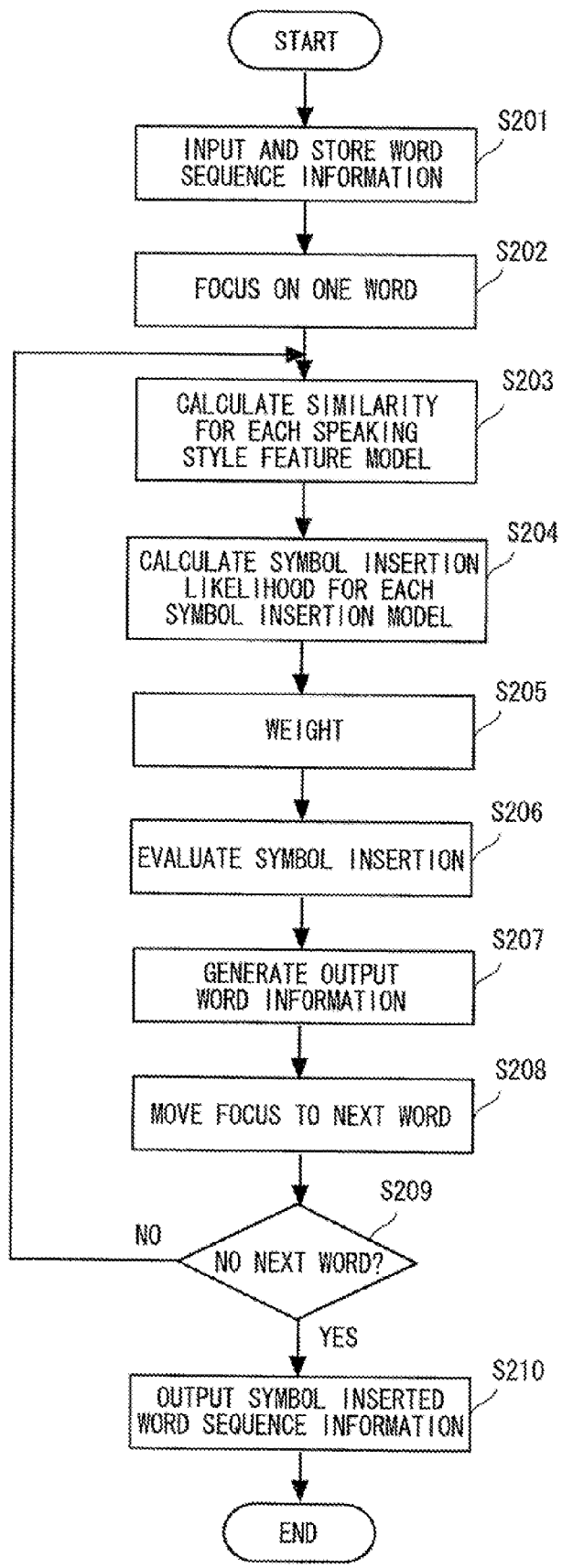
FIG. 5 is a flowchart illustrating a process flow in a mode for the invention of the embodiment 1 of the present invention.

If information of a word sequence to insert a symbol in is input from the input apparatus 102, the processing apparatus 101 stores it to the word sequence information storage means 111 as illustrated in FIG. 2 (S201 in FIG. 5).

Next, the processing apparatus 101 focuses on a word included in the first word information 1022 in the word sequence information 1021 of the word sequence that is stored to the word sequence information storage means 111 (S202).

Next, the processing apparatus 101 reads the word information of the focused word from the word sequence information storage means 111 by the speaking style feature similarity calculation means 112, and at the same time, reads the speaking style feature model from the speaking style feature model storage apparatuses 104-1 to 104-n, and calculates the similarity in the speaking style between the focused word and n number of speaking style feature models using the formula (4) for each of insertion symbols, which are a period, comma, and NULL (S203).

Next, the processing apparatus 101 reads the word information of the focused word from the word sequence information storage means 111 by the symbol insertion likelihood calculation means 113, and at the same time, reads the symbol insertion model from the symbol insertion model storage apparatuses 103-1 to 103-n, and calculates the symbol insertion likelihood for inserting a period, comma, and NULL immediately after the focused word for each of the n number of symbol insertion models (S204).

Next, the processing apparatus 101 performs weighting by multiplying the symbol insertion likelihood calculated for each symbol insertion model by the similarity in speaking style between the corresponding speaking style feature model and the word being watched using the formula (6) by the symbol insertion likelihood calculation means 113 (S205).

Next, the processing apparatus 101 determines by the symbol insertion likelihood calculation means 113 whether it is possible to insert a punctuation mark immediately after the focused word and in the case of insertion, which of the symbols, a period and comma, according one of the abovementioned symbol insertion evaluation methods of the examples 1 to 3 (S206). Then, the symbol insertion likelihood calculation means 113 generates output word information including the focused word according to the symbol insertion evaluation result, and stores it to the symbol inserted word sequence information storage means 115 (S207).

After finishing the process of focusing the first word in the information 1021 of the word sequence stored to the word sequence information storage means 111, the processing apparatus 101 moves focus to the second word in the information 1021 of the word sequence (S208), and repeats the processes of the steps S203 to S207. Once the processing apparatus 101 completes the process to focus the last word in the information 1021 of the word sequence stored to the word sequence information storage means 111 (YES in the step S209), the information of the word sequence with symbols inserted stored to the symbol inserted word sequence information storage means 115 is output from the output apparatus 105 (S210).

Note that in the flowchart of FIG. 5, the speaking style feature similarity and the symbol insertion likelihood for a word are calculated in the process of focusing the word, however the speaking style feature similarities of all the words may be calculated first, and then focus the word one by one to calculate the symbol insertion likelihood. However, in such case, the calculated feature similarities must be stored till weighted.

Embodiment 2

Figure 6:
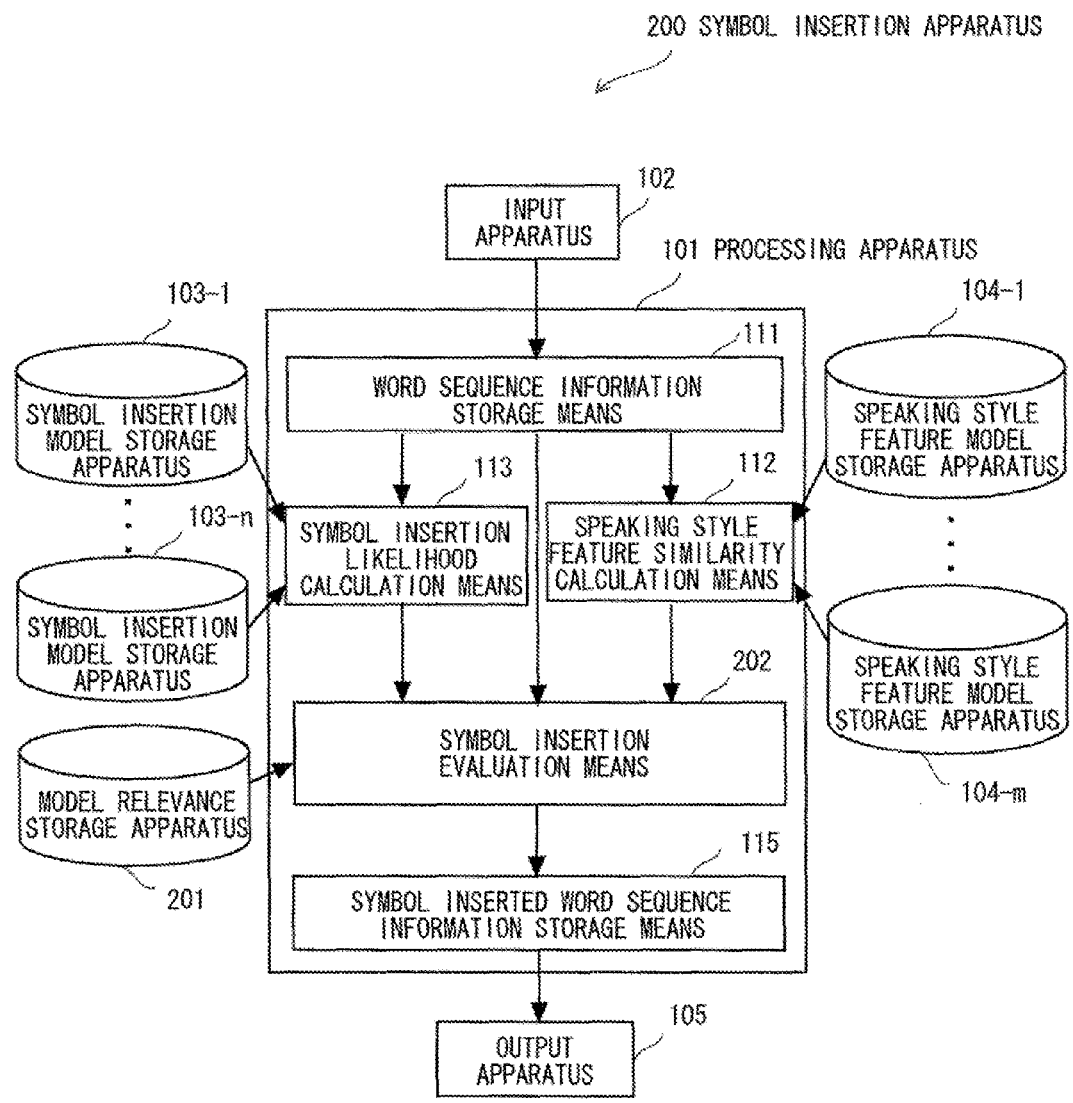
FIG. 6 is a block diagram of an embodiment 2 of the present invention.

Referring to FIG. 6, a symbol insertion apparatus 200 according to the embodiment 2 of the present invention is different as compared to the symbol insertion apparatus 100 according to the embodiment 1 illustrated in FIG. 1 in that the n number of symbol insertion models stored to the n number of symbol insertion model storage apparatuses 103-1 to 103-n do not correspond one-to-one to the m number of speaking style feature models stored to the m number of speaking style feature model storage apparatuses 104-1 to 104-n.

As explained with reference to FIG. 4, in the embodiment 1, the learning data used to create the symbol insertion model is the same as the learning data used to create the speaking style feature model, thus the symbol insertion models correspond one-to-one to the speaking style feature models. However, the learning data used to create the symbol insertion model and the learning data used to create the speaking style feature model are not necessarily the same depending on the way to create the models, thus it is possible that the learning data used to create multiple speaking style feature models are mixed in the learning data used to create a certain symbol insertion model.

For example, in FIG. 4, if m kinds of genres (for example, a news program or variety show in the case that each speaker is an announcer) is included in the learning data $D_A$ to $D_Z$ of each speaker A to Z, a symbol insertion model is created for each genre, and the speaking style feature models $SM_{AB}$ to $SM_{YZ}$ are created in a similar manner as the embodiment 1. Then the n number of symbol, insertion models do not correspond one-to-one to the m number of speaking style feature models. This embodiment aims to enable symbol insertion evaluation in consideration of the difference in the speaking style features between speakers even under such circumstance.

Therefore, this embodiment newly includes a model relevance storage apparatus 201 that stores relevance between the n number of symbol insertion models and the m number of speaking style feature models, and the processing apparatus 101 includes a symbol insertion evaluation means 202 instead of the symbol insertion evaluation means 114.

Figures 7, 8:
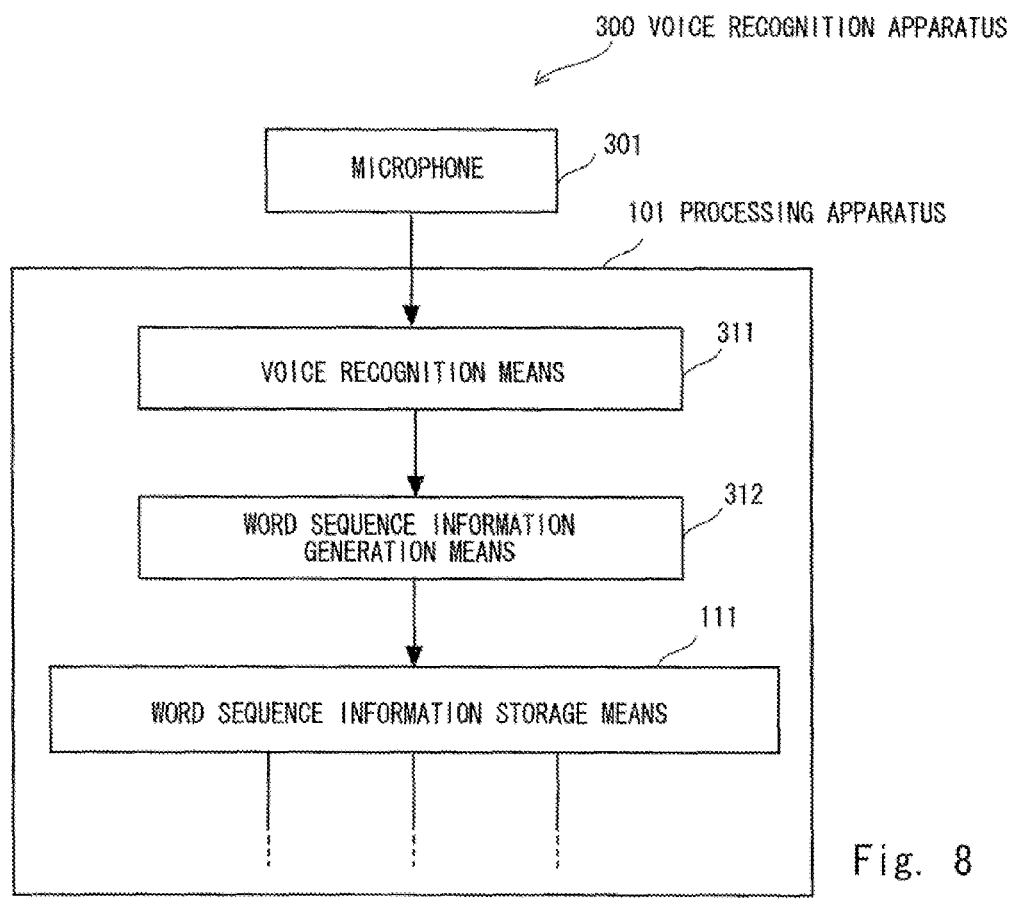
FIG. 7 illustrates an example of a relevance between the symbol insertion model and the speaking style feature model.
FIG. 8 is a block diagram of an embodiment 3 of the present invention.

The model relevance storage apparatus 201 stores the relevance between the speaking style feature model stored to the speaking style feature model storage apparatus 104-i (1<=i<=m) and the symbol insertion model stored to the symbol insertion model storage apparatus 103-j (1<=j<=n). An example of the relevance $O_{i,j}$ stored to the model relevance storage apparatus 201 is illustrated in FIG. 7. According to this example, the model relevance $O_{2,4}$ between the speaking style feature model stored to the speaking style feature model storage apparatus 104-4 and the symbol insertion model stored to the symbol insertion model storage apparatus 103-2 is 0.03. Each model relevance $O_{i,j}$ is a constant determined by the degree of overlap between the learning data used to learn the symbol insertion model and the learning data used to learn the speaking style feature model. The model relevance $O_{i,j}$ can be obtained using mutual information amount or the like.

The symbol insertion evaluation means 202 of the processing apparatus 101 is different as compared to the symbol insertion evaluation means 114 according to the embodiment 1 in the point that the symbol insertion score for different models $F_i(w_t,C_k)$ of the ith symbol insertion model is calculated using the following formula.

$$F_i(w_t, C_k) = \sum_i^m T_{i,k}(w_t) \times S_{j,k}(w_t) \times O_{i,j} \quad (12)$$

In the embodiment 1, the speaking style feature model and the symbol insertion model correspond one-to-one, thus the symbol insertion score for different models is calculated using the speaking style feature similarity as a weight as in the formula (6), However in this embodiment, since the speaking style feature model and the symbol insertion model do not correspond one-to-one, $O_{i,j}$ indicating the relevance (correspondence relationship) of data between the speaking style feature model and the symbol insertion model are used as an additional weight, so as to obtain the symbol insertion score for different models in which the symbol $C_k$ is inserted.

Other configurations and operations including the method of performing symbol insertion evaluation from the calculated symbol insertion score for different models are same as the embodiment 1.

Next, an effect of this embodiment is explained.

According to this embodiment, the similar effect as the embodiment 1 can be achieved, and at the same time, it is not necessary for the speaking style feature model and the symbol insertion model to correspond one-to-one, the degree of freedom in creating the models can be improved.

Embodiment 3

Referring to FIG. 8, a voice recognition apparatus 300 according to the embodiment 3 of the present invention has the configuration which newly includes a voice recognition means 311 and a word sequence information generation means 312 in the processing apparatus 101 composing the symbol insertion apparatus 100 or 200 according to the embodiment 1 or 2, and also a microphone 301 connected to the processing apparatus 101. The voice recognition means 311 and the word sequence information generation means 312 can be realized by a computer and a program composing the processing apparatus 101.

A voice signal input from the microphone 301 is transmitted to the voice recognition means 311 of the processing apparatus 101, given a known voice recognition process, and a voice recognition result is output to the word sequence information generation means 312. In addition to information of which word is uttered, the time the word is uttered and word class information of the word (information such as word class and inflected forms) are added to the voice recognition result, which is output in a predetermined format.

The word sequence information generation means 312 obtains the surface layer information and the word class information of the word by pattern matching from the voice recognition result output in the predetermined format. Further, a pause length is calculated by taking a difference between start time and termination time of the previous and next word. Then, the word sequence information generation means 312 generates the word sequence information 1021 as illustrated in FIG. 2, and stores it to the word sequence information storage means 111.

Henceforth, symbols such as a punctuation mark are inserted in the word sequence stored to the word sequence information storage means 111 by the similar configuration or operation as the embodiment 1 or 2.

Next, a effect of this embodiment is explained.

According to this embodiment, a voice recognition apparatus is obtained which performs voice recognition to voice uttered by a speaker, to this voice recognized word sequence, follow to automatically insert symbols such as a punctuation mark.

The present invention is explained with reference to the embodiments, however the present invention is not limited to the above embodiments. Various modifications understandable by a person skilled in the art can be made to the configuration and details of the present invention within the scope of the present invention.

INDUSTRIAL APPLICABILITY

According to the present invention, it is possible to apply to usages such as a voice recognition apparatus for transcribing a voice signal and a program for realizing the voice recognition apparatus on the computer, for example. Further, it is possible to apply to usages such as a content reproduction apparatus or content search apparatus that divide voice or video content into appropriate units and display or reproduce the content by the divided unit, and a transcription support apparatus of the recorded voice data.

The invention claimed is:

1. A symbol insertion apparatus for inserting a symbol in a word sequence transcribing voice information comprising:
a symbol insertion likelihood calculation unit that obtains a symbol insertion likelihood of the word sequence for each of a plurality of symbol insertion models, the plurality of symbol insertion models being supplied for the word sequence to insert the symbol in for each speaking style feature;
a speaking style feature similarity calculation unit that obtains a similarity between the speaking style feature of the word sequence and a plurality of speaking style feature models; and
a symbol insertion evaluation unit, implemented by a processor, that weights the symbol insertion likelihood obtained for the word sequence for each of the plurality of symbol insertion models according to the similarly between the speaking style feature of the word sequence and the plurality of speaking style feature models and a relevance between the symbol insertion model and the speaking style feature model, and perform symbol insertion evaluation to the word sequence.

2. The symbol insertion apparatus according to claim 1, wherein the speaking style feature is at least acoustic feature amount.

3. The symbol insertion apparatus according to claim 1, wherein the relevance is a constant determined by a degree of overlap between learning data used to learn the symbol insertion model and learning data used to learn the speaking style feature model.

4. The symbol insertion apparatus according to claim 1, further comprising a model relevance storage unit that holds the relevance.

5. The symbol insertion apparatus according to claim 1, wherein for the symbol insertion likelihood obtained for the word sequence by a certain symbol insertion model, if the symbol insertion likelihood weighted according to the similarity between the speaking style feature of the word sequence and the plurality of speaking style feature models and the relevance between the symbol insertion model and the plurality of speaking style feature models is defined as symbol insertion likelihood for different models, the symbol insertion evaluation unit calculates, for each symbol to be inserted, a total of a predetermined number of the symbol insertion likelihood for different models selected from a plurality of the symbol insertion likelihood for different models which are obtained for the plurality of symbol insertion models, and evaluates the symbol with the largest total as an insertion symbol.

6. The symbol insertion apparatus according to claim 5, wherein the symbol insertion evaluation unit selects a predetermined number in order of high likelihood among the plurality of symbol insertion likelihood obtained for the plurality of symbol insertion models.

7. The symbol insertion apparatus according to claim 1, wherein for the symbol insertion likelihood obtained for the word sequence by a certain symbol insertion model, if the symbol insertion likelihood weighted according to the similarity between the speaking style feature of the word sequence and the plurality of speaking style feature models and the relevance between the symbol insertion model and the plurality of speaking style feature models is defined as symbol insertion likelihood for different models, the symbol insertion evaluation unit calculates, for each symbol to be inserted, a total of a predetermined number of the symbol insertion likelihood for different models selected from a plurality of the symbol insertion likelihood for different models which are obtained for the plurality of symbol insertion models, and performs symbol insertion evaluation by comparing the total with the threshold.

8. The symbol insertion apparatus according to claim 1, wherein for the symbol insertion likelihood obtained for the word sequence by a certain symbol insertion model, if the symbol insertion likelihood weighted according to the similarity between the speaking style feature of the word sequence and the plurality of speaking style feature models and the relevance between the symbol insertion model and the plurality of speaking style feature models is defined as symbol insertion likelihood for different models, the symbol insertion evaluation unit, for each of the symbol insertion model, obtains an insertion symbol having the largest symbol insertion likelihood for different models, and performs symbol insertion evaluation by a majority decision of the insertion symbol obtained for each of the symbol insertion model.

9. A voice recognition apparatus comprising:
a voice recognition unit that performs voice recognition to input voice and outputs a voice recognized result; and
a word sequence information generation unit that generates a word sequence to insert a symbol in from the voice recognized result output from the voice recognition unit, the word sequence being input to the symbol insertion apparatus according to claim 1.

10. A symbol insertion method for inserting a symbol in a word sequence transcribing voice information, the method comprising:
obtaining a symbol insertion likelihood of the word sequence for each of a plurality of symbol insertion models, the plurality of symbol insertion models being supplied for the word sequence to insert the symbol in for each speaking style feature; obtaining a similarity between the speaking style feature of the word sequence and a plurality of speaking style feature models; and
weighting, by a processor, the symbol insertion likelihood obtained for the word sequence for each of the plurality of symbol insertion models according to the similarly between the speaking style feature of the word sequence and the plurality of speaking style feature models and a relevance between the symbol insertion model and the speaking style feature model, and
performing symbol insertion evaluation to the word sequence.

11. The symbol insertion method according to claim 10, wherein the speaking style feature is at least acoustic feature amount.

12. The symbol insertion method according to claim 11, wherein the relevance is a constant determined by a degree of overlap between learning data used to learn the symbol insertion model and learning data used to learn the speaking style feature model.

13. The symbol insertion method according to claim 10, wherein the relevance is input from a model relevance storage unit that holds the relevance.

14. The symbol insertion method according to claim 10, wherein for the symbol insertion likelihood obtained for the word sequence by a certain symbol insertion model, if the symbol insertion likelihood weighted according to the similarity between the speaking style feature of the word sequence and the plurality of speaking style feature models and the relevance between the symbol insertion model and the plurality of speaking style feature models is defined as symbol insertion likelihood for different models, calculating, for each symbol to be inserted, a total of a predetermined number of the symbol insertion likelihood for different models selected from a plurality of the symbol insertion likelihood for different models which are obtained for the plurality of symbol insertion models, and evaluating the symbol with the largest total as an insertion symbol.

15. The symbol insertion method according to claim 14, further comprising:
selecting a predetermined number in order of high likelihood among the plurality of symbol insertion likelihood obtained for the plurality of symbol insertion models.

16. The symbol insertion method according to claim 10, wherein for the symbol insertion likelihood obtained for the word sequence by a certain symbol insertion model, if the symbol insertion likelihood weighted according to the similarity between the speaking style feature of the word sequence and the plurality of speaking style feature models and the relevance between the symbol insertion model and the plurality of speaking style feature models is defined as symbol insertion likelihood for different models, calculating, for each symbol to be inserted, a total of a predetermined number of the symbol insertion likelihood for different models selected from a plurality of the symbol insertion likelihood for different models which are obtained for the plurality of symbol insertion models, and performing symbol insertion evaluation by comparing the total with the threshold.

17. The symbol insertion method according to claim 10, wherein for the symbol insertion likelihood obtained for the word sequence by a certain symbol insertion model, if the symbol insertion likelihood weighted according to the similarity between the speaking style feature of the word sequence and the plurality of speaking style feature models and the relevance between the symbol insertion model and the plurality of speaking style feature models is defined as symbol insertion likelihood for different models, obtaining, for each of the symbol insertion model, an insertion symbol having the largest symbol insertion likelihood for different models, and performing symbol insertion evaluation by a majority decision of the insertion symbol obtained for each of the symbol insertion model.

18. A non-transitory computer-readable recording media recording a program for causing a computer to function as a symbol insertion apparatus for inserting a symbol in a word sequence transcribing voice information comprising: a symbol insertion likelihood calculation unit that obtains a symbol insertion likelihood of the word sequence for each of a plurality of symbol insertion models, the plurality of symbol insertion models being supplied for the word sequence to insert the symbol in for each speaking style feature;
- a speaking style feature similarity calculation unit that obtains a similarity between the speaking style feature of the word sequence and a plurality of speaking style feature models; and
- a symbol insertion evaluation unit that weights the symbol insertion likelihood obtained for the word sequence for each of the plurality of symbol insertion models according to the similarly between the speaking style feature of the word sequence and the plurality of speaking style feature models and a relevance between the symbol insertion model and the speaking style feature model, and perform symbol insertion evaluation to the word sequence.

19. A non-transitory computer-readable recording media according to claim 18, wherein the speaking style feature is at least acoustic feature amount.

20. A non-transitory computer-readable recording media according to claim 18, wherein the relevance is a constant determined by a degree of overlap between learning data used to learn the symbol insertion model and learning data used to learn the speaking style feature model.

21. A non-transitory computer-readable recording media according to claim 18, wherein the computer comprises a model relevance storage means that holds the relevance.

22. A non-transitory computer-readable recording media according to claim 18, wherein for the symbol insertion likelihood obtained for the word sequence by a certain symbol insertion model, if the symbol insertion likelihood weighted according to the similarity between the speaking style feature of the word sequence and the plurality of speaking style feature models and the relevance between the symbol insertion model and the plurality of speaking style feature models is defined as symbol insertion likelihood for different models, the symbol insertion evaluation unit calculates, for each symbol to be inserted, a total of a predetermined number of the symbol insertion likelihood for different models selected from a plurality of the symbol insertion likelihood for different models which are obtained for the plurality of symbol insertion models, and evaluates the symbol with the largest total as an insertion symbol.

23. A non-transitory computer-readable recording media according to claim 18, wherein for the symbol insertion likelihood obtained for the word sequence by a certain symbol insertion model, if the symbol insertion likelihood weighted according to the similarity between the speaking style feature of the word sequence and the plurality of speaking style feature models and the relevance between the symbol insertion model and the plurality of speaking style feature models is defined as symbol insertion likelihood for different models, the symbol insertion evaluation unit calculates, for each symbol to be inserted, a total of a predetermined number of the symbol insertion likelihood for different models selected from a plurality of the symbol insertion likelihood for different models which are obtained for the plurality of symbol insertion models, and performs symbol insertion evaluation by comparing the total with a threshold.

24. A non-transitory computer-readable recording media according to claim 22, wherein the symbol insertion evaluation unit selects a predetermined number in order of high likelihood from the plurality of symbol insertion likelihood obtained for the plurality of symbol insertion models.

25. A non-transitory computer-readable recording media according to claim 18, wherein for the symbol insertion likelihood obtained for the word sequence by a certain symbol insertion model, if the symbol insertion likelihood weighted according to the similarity between the speaking style feature of the word sequence and the plurality of speaking style feature models and the relevance between the symbol insertion model and the plurality of speaking style feature models is defined as symbol insertion likelihood for different models, the symbol insertion evaluation unit, for each of the symbol insertion model, obtains an insertion symbol having the largest symbol insertion likelihood for different models, and performs symbol insertion evaluation by a majority decision of the insertion symbol obtained for each of the symbol insertion model.

26. A non-transitory computer-readable recording media according to claim 18 that further causes the computer to function as:
- a voice recognition unit that performs voice recognition to input voice and outputs a voice recognized result; and
- a word sequence information generation unit that generates the word sequence to insert the symbol in from the voice recognized result output from the voice recognition unit.

* * * * *